ns

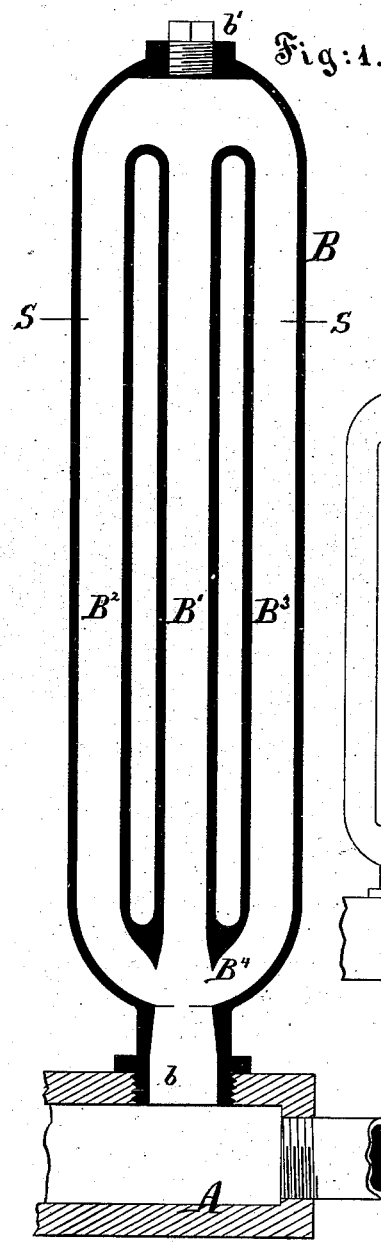

UNITED STATES PATENT OFFICE.

RICHARD S. GILLESPIE, OF NEW YORK, N. Y., ASSIGNOR TO HUNTER, KELLER, & CO., OF SAME PLACE.

IMPROVEMENT IN STEAM-RADIATORS.

Specification forming part of Letters Patent No. 192,755, dated July 3, 1877; application filed March 14, 1877.

*To all whom it may concern:*

Be it known that I, RICHARD S. GILLESPIE, of New York city, in the State of New York, have invented certain new and useful Improvements in Steam-Radiators for Warming Buildings; and I do hereby declare that the following is a full and exact description thereof.

I have devised a form, adapted to be produced in cast-iron, which presents a large amount of heating-surface with assurance of early and active circulation of the steam.

It has heretofore been attempted to induce circulation by leading the steam up through a small pipe in the interior of a large one. It promoted circulation, but the surface of the inside pipe was obviously inefficient in radiating heat to the surrounding air.

Others have made castings in the form of a loop, arranging for the steam to ascend in one arm and descend in the other. Such allowed the entire surface to be effective in heating the air, but it is difficult if not impracticable with such to insure that the steam shall commence promptly to circulate. Projections have been arranged to arrest the current of steam and deflect it into the loop, but when the steam is motionless there is little inducement for the current to ascend in one arm more than the other.

I provide two or more descending arms, in which the large amount of radiating-surface insures that the steam shall condense rapidly. I provide one central arm directly in the wake of the entering steam, so as to receive the full impulse if it has any motion, and by reason of its central position I insure a warmer condition therein than in the exterior arms. Whether the steam is moving actively, or is exerting a still dead pressure against the air imprisoned above, my central pipe, while serving efficiently as a heating-surface, is certain to carry the steam rapidly to the top.

The following is a description of what I consider the best means of carrying out the invention. The accompanying drawings form a part of this specification.

Figure 1 is a central vertical section through one of the radiators and a portion of the base. Fig. 2 is a horizontal section through the radiator on the line S S. Fig. 3 represents, on a smaller scale, a larger portion of the base with a number of the radiators arranged in what I esteem the preferable position thereon. Fig. 4 will be described farther on.

Similar letters of reference indicate corresponding parts in all the figures.

A is the base or foot, made of cast-iron in any ordinary or suitable form. It is connected by pipes with a steam-boiler, (not represented,) and the access of steam may be controlled by valves, as usual. The holes are tapped to receive the correspondingly-threaded hollow stems $b$ of my radiator B, the several parts of which are marked $B^1$ $B^2$, &c. $B^1$ is a straight hollow pipe, mounted directly over the neck $b$. $B^2$ and $B^3$ are parallel pipes, connected at the top and bottom, as shown. These parts are cast together. There is a screw-plug at the top, as indicated by $b'$.

There may be a number of these radiators tapped into a single base.

The interior of the neck $b$ should have a capacity a little greater than the interior of the central pipe $B^1$. The two side pipes $B^2$ $B^3$ should each have the same capacity as the central pipe. So soon as the circulation is established all commence to be, and remain, efficient heating-surface. By reason of there being two instead of one side pipe, they radiate heat from both sides on the central pipe, and cause the latter to become the warmest. They also measurably protect the central pipe from the access of cold air. When the whole is efficiently working, air circulates actively in all the spaces. But the air which reaches the central pipe is likely to be partially warmed by its previous passage in the vicinity of the outside pipes. The current of air is inward toward the central pipe, near the bottom of the radiator, and outward near the top. The conditions insure that the outside pipes shall condense the steam most rapidly.

I promote the circulation by not only placing the central pipe $B^1$ directly over and exposed to any upward current of steam through the neck, but I preferably flare the bottom, as indicated at $B^4$, so that the upward current all converge into the central pipe. The interior of the neck $b$ may be formed with vertical ridges or channels, if desired, to promote the trickling down of the water of condensation in opposition to an active current of steam rising into the center.

Many modifications may be made in the form without defeating the objects of the invention. More than three pipes may be made in a single casting. I propose in some cases to surround the central pipe with six or other large number of descending pipes, but facility of casting and convenience in the use will, I think, be promoted by making only three.

Fig. 4 shows a form which involves the qualities of my invention, but only in a small degree. In proportion as the pipes are crowded together and only divided by a single thickness of metal, the invention approximates some of the old forms. I greatly prefer that my pipes shall be distinct, touching each other only where they communicate at the top and bottom.

I claim as my invention—

The within-described radiator composed of an ascending pipe, $B^1$, and two or more descending pipes, $B^2$ $B^3$, connected at the top and bottom, the whole serving as efficient heating-surface, (with the assurance that the central pipe shall maintain the highest temperature,) as and for the purposes herein specified.

In testimony whereof I have hereunto set my hand this 12th day of March, 1877, in the presence of two subscribing witnesses.

RICH. S. GILLESPIE.

Witnesses:
 THOMAS D. STETSON,
 CHAS. C. STETSON.